(12) United States Patent
Kim et al.

(10) Patent No.: US 6,909,848 B2
(45) Date of Patent: Jun. 21, 2005

(54) SELF-ADJUSTING BIT RATE TRANSDUCER IN OPTICAL TRANSMISSION SYSTEM

(75) Inventors: Sang-Ho Kim, Seoul (KR); Jun-Ho Koh, Songnam-shi (KR); Kwang-Jin Yang, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 600 days.

(21) Appl. No.: 09/852,923

(22) Filed: May 10, 2001

(65) Prior Publication Data

US 2001/0046076 A1 Nov. 29, 2001

(30) Foreign Application Priority Data

May 24, 2000 (KR) ........................................ 2000-28076

(51) Int. Cl.[7] .............................................. H04J 14/02
(52) U.S. Cl. ........................ 398/27; 398/155; 398/154
(58) Field of Search .......................... 398/27, 154, 155; 375/224; 370/352

(56) References Cited

U.S. PATENT DOCUMENTS 6,549,572 B1 * 4/2003 Anderson et al. ........... 375/225

2003/0161635 A1 * 8/2003 Milton et al. ................. 398/79

OTHER PUBLICATIONS

"Bit–rate transparent electronic data regeneration in repeaters for high speed lightwave communication systems", Mokhtari et al., Circuits and Systems, Proceedings of the 1999 IEEE International Symposium on, vol. 2, May 30–Jun. 2, 1999, p. 508–511.*

* cited by examiner

Primary Examiner—M. R. Sedighian
Assistant Examiner—Nathan Curs
(74) Attorney, Agent, or Firm—Cha & Reiter, L.L.C.

(57) ABSTRACT

A self-healing bit rate transducer in an optical transmission system includes a demultiplexer for demultiplexing optical signals into different wavelength channels; bit rate receivers for converting the demultiplexed optical signals into the corresponding electrical signals, for generating a bit-rate error signal, and for generating a temperature reference signal; a detecting section for generating a signal indicative of the bit rate of the optical signals outputted from the demultiplexer; and a controller for comparing the detected bit rate with a predetermined data to generate a control signal that is used to adjust the bit rate of the respective bit rate receiver.

15 Claims, 2 Drawing Sheets

FIG. 1 [PRIOR ART]

SELF-ADJUSTING BIT RATE TRANSDUCER IN OPTICAL TRANSMISSION SYSTEM

CLAIM OF PRIORITY

This application makes reference to, incorporates the same herein, and claims all benefits accruing under 35 U.S.C. Section 119 from an application for "SELF-HEALING BIT RATE TRANSDUCER IN OPTICAL TRANSMISSION SYSTEM," filed earlier in the Korean Industrial Property Office on May 4, 2000 and there duly assigned Serial No. 2000-28076.

BACKGROUND OF THE INVENTION

1. Field of the Invention

The present invention relates to an optical transmission system, and more particularly to a self-healing bit rate transducer in an optical cross-connection device.

2. Description of the Related Art

In general, diverse protocols and bit rates can be employed in an optical transmission system. Some examples of such protocols includes the fiber distributed data interface (FDDI), the enterprise system connectivity (ESCON), the optical fiber channel, Ethernet, the asynchronous transfer mode (ATM), etc., and their bit rates are 124 Mb/s, 155 Mb/s, 200 Mb/s, 622 Mb/s, 1062 Mb/s, 1.25 Gb/s, 2.5 Gb/s, respectively.

A single protocol and bit rate are typically employed for each of above protocols in an optical transmission system, and the bit rate of an optical signal is pre-set in such a system. Hence, an optical receiver installed in a transmitter or a terminal, etc. is typically designed to exclusively meet the pre-set protocol and the bit rate. Typically, systems for transmitting digital data, especially on an optical link, the quality of transmission depends largely on the performance of the transmitter and the receiver.

FIG. 1 is a block diagram illustrating an optical cross-connection device (OXR) employing an electric switch according to the conventional art system. Referring to FIG. 1, the conventional OXR includes a demultiplexer (DEMUX) 106 for demultiplexing inputted optical signals according different channels and for outputting the same; a plurality of photo-electric transducers 102 with a steady bit rate for transducing an optical signal outputted from the DEMUX 106 into the corresponding electric signal; an OXR switch 103 for pass-routing and outputting the electric signal inputted from the plurality of optical transducers 102 at a steady bit rate; a plurality of electro-optic transducers 104 with a steady bit rate for transducing the electric signals outputted from each output port of the OXR 103 into the corresponding optical signals and for outputting the same; and, a multiplexer 107 for multiplexing the optical signals 105 outputted from the plurality of electro-optic transducers 104 at a steady bit rate through a single optical fiber and outputting the same. Here, the OXR switch 103 is controlled by a controller 108.

As the OXR device in the conventional optical transmission system houses the photo-electric transducer (optical receiver) at a steady bit rate and the electro-optic transducer (optical transmitter) at a steady bit rate, the connection is performed under a predetermined type of steady transmission format. This means that the OXR device in the conventional optical transmission system lacks adaptability to the variation in the transmission format and the varying bit rate. Hence, the limitation of a cross connection capability only in a steady data network poses a problem in multiple transmission and network management.

A co-pending U.S. patent application Ser. No. 09/621,009 filed earlier by the same applicant on Jul. 20, 2000, entitled "Method and Device for Optical Receiving Not Relying on a Bit rate, discloses the construction of a transduction for informing the bit rate using only a data DC level value. In the co-pending application, the controller sections inside each of the transmission section and receiving section recognize the variation of the bit rate. However, another central controller that is costly needs to be housed therein. This patent application further discloses some drawbacks in that the information on the bit rate is relied on the data DC level value only, thereby resulting in errors in recognizing the bit rate if there is any variation in the temperature within the system.

SUMMARY OF THE INVENTION

The present invention relates to a self-healing bit rate transducer capable of maintaining the bit rate in an optical network. More particularly, the present invention relates to a transducer capable of dynamically compensate for external environmental elements, particularly to the variation of temperature.

Accordingly, there is provided an optical transmission system, which includes a demultiplexer for demultiplexing optical signals into different wavelength channels; a plurality of bit rate receivers coupled to the output of the demultiplexing means for converting the demultiplexed optical signals into the corresponding electrical signals and for generating a bit-rate error signal, the bit rate receiver having a sensing means for generating a temperature reference signal; a detecting section coupled to the output of said demultiplexer for generating a signal indicative of the bit rate of the optical signals outputted therefrom; and, a controller for comparing the bit rate detected by the detecting section with a predetermined data to generate a control signal that is used to adjust the bit rate of the respective bit rate receiver.

BRIEF DESCRIPTION OF THE DRAWINGS

The above and other features and advantages of the present invention will become more apparent from the following detailed description when taken in conjunction with the accompanying drawings, in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For the purpose of simplicity and clarity, detailed descriptions of well-known devices, circuits, and methods are omitted so as not to obscure the description of the present invention with unnecessary detail.

Figure 1:
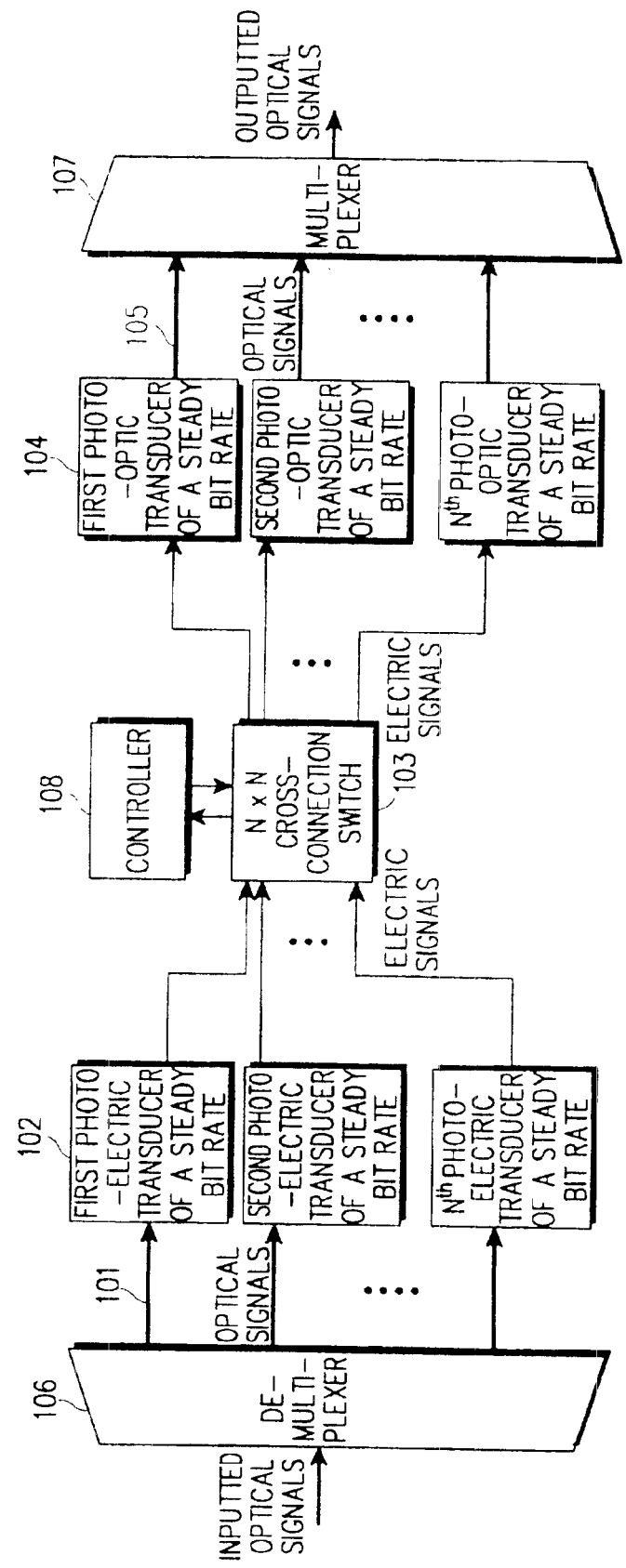
FIG. 1 is a block diagram illustrating the OXR device using an electric switch according to an embodiment of the conventional system; and, FIG. 2 is a block diagram illustrating the OXR device using an electric switch according to an embodiment of the present invention.
Figure 2:
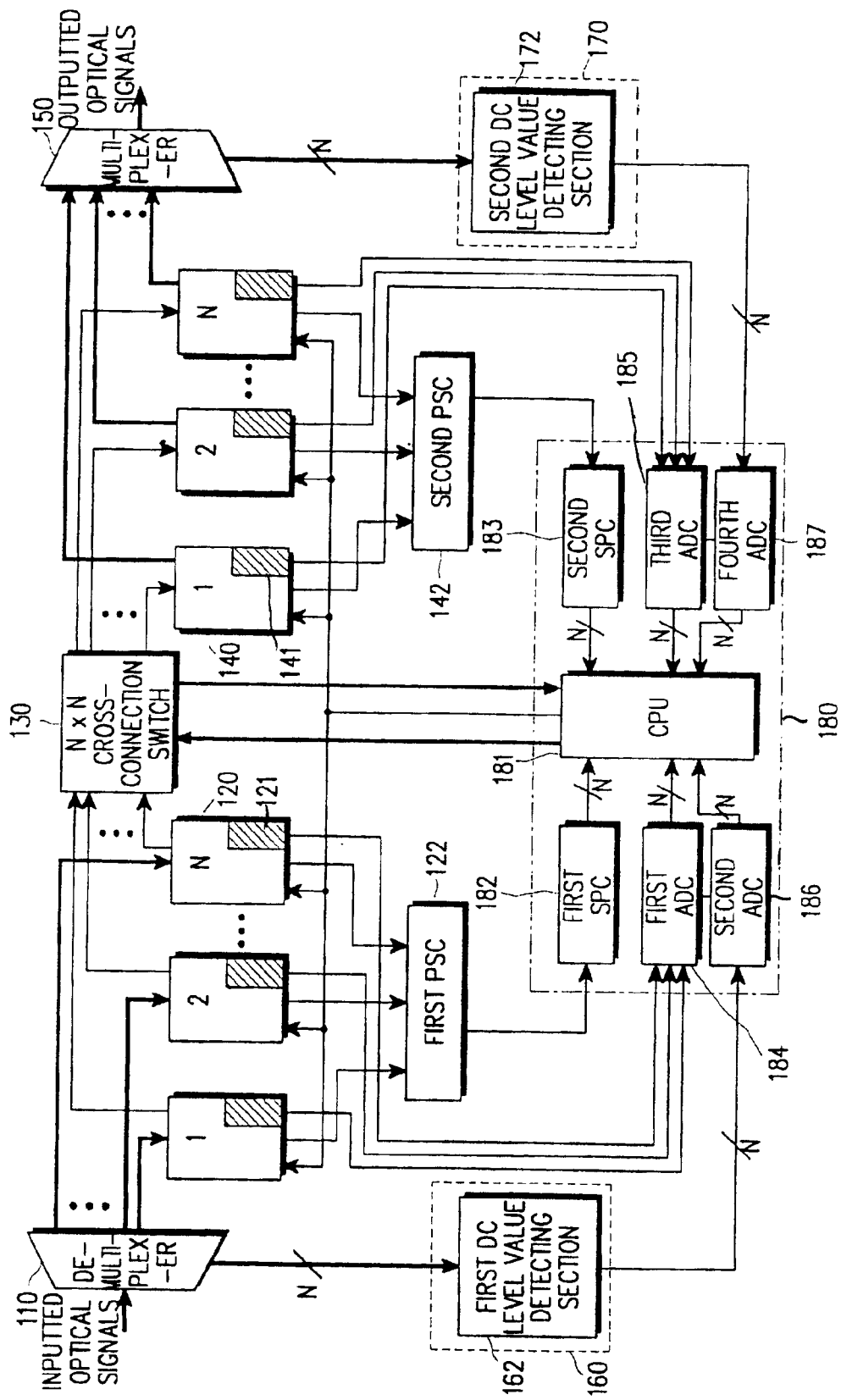

FIG. 2 is a block diagram illustrating an optical cross-connection (OXR) device using an electric switch according to the embodiment of the present invention. The optical transmission system includes a DMUX 110 for demultiplexing inputted optical signals into different channels and outputting the demultiplexed signals; a plurality of bit rate independent clock and data recover (BICDR) receivers 120 for transducing the optical signals outputted from the DMUX 110 into respective electric signals; an N×N cross-connection switch 130 for pass-routing and outputting electric signals outputted from the BICDR receivers 120; a plurality of BICDR transmitters 140 for transducing electric signals outputted from each port of the cross-connection switch 130 into to optical signals; and a multiplexer 150 for multiplexing the signals applied from the BICDR transmitters 140 and outputting the same as optical signals. The function of BICDR receiver 120 is to convert optical input signal into the corresponding electrical signal while recovering a clock and data during the conversion process. The recovered clock and data are applied to the cross-connection switch 130. At the same time, if the bit rate of the converted electrical signal is not consistent with the bit rate that is pre-set to each BICDR receiver 120, each BICDR 120 outputs a bit-rate error signal, namely a PLL loss of lock signal. This technique is disclosed in the co-pending U.S. application Ser. No. 09/621,009, the content of which is incorporated herein by reference.

Included in the embodiment is: each BICDR receiver 120 having a temperature sensing section 121 for sensing the temperature to provide temperature sending signals; a first DC level value detecting section 162 for detecting a DC level value representing each bit rate of optical signals outputted from the DEMUX 10; and, a control device 180 for receiving the temperature sensing signals from the temperature sensing section 121 of the corresponding BICDR receiver, for receiving a DC level value representing each bit rate of the optical signal outputted from the DEMUX 110, and for receiving a bit-rate error signal from each BICDR receiver 120. Here, the optical signals supplied to the BICDR receivers 120 and the first DC level value detecting-section 162 from the DMUX 110 are the same.

The bit rate transducer according to the present invention further includes a first parallel to serial converter (hereinafter, referred to as "a first PSC") 122 for converting the PLL signals representing the bit rate improper signal outputted from the BICRD receivers 120 into serial signals, and a first serial to parallel converter (hereinafter, referred to as "a first SPC") 182 for supplying the serial signals outputted from the first PSC 122 to a CPU 181 of the control device 180 as parallel signals. The control device 180 further includes a first analog-to-digital converter (hereinafter, referred to as "a first ADC") 184 for converting the temperature sensing signals supplied from the temperature sensing section 121 of the BICDR receivers 120 into the corresponding digital signals, and a second analog-to-digital converter (hereinafter, referred to as "a second ADC") 186 for converting the DC level value supplied from the DC level detecting section 162 to the control device 180 as digital signals.

Now, the operation of the bit-rate transducer according to the present invention will now be described in detail.

According to the embodiment of the present invention, the inputted optical signals passing through the DMUX 110 are demultiplexed into different channels according to the wavelengths. The optical signals outputted from the DMUX are transduced into the corresponding electric signals. At this time, a clock and data are recovered from the demultiplexed signals according to the bit rate of the converted electric signals and transmitted by the respective BICDR receivers 120. Subsequently, the BICDR receivers 120 output a bit-rate error signal, i.e., a PLL signal, if current bit rate is not consistent with a pre-set bit rate. The first PSC 122 converts the PLL signals received from each BICDR receiver 120 and convert them in form of a serial signal to be supplied to the first SPC 182 of the control device 180. In response, the first SPC 182 converts the output signals of the first PSO 122 in a serial type to parallel signals, then forwards the converted parallel signals to the CPU 181 of the control device 180.

Meanwhile, the bit rate generating section 160 including a first DC level value detecting section 162 detects the signals outputted from the DMUX 110 and supplies a DC level value representing each bit rate of the output signals of the DMUX 110 to the second ADC 186 of the controller 180. At the same time, The temperature value sensed by the temperature sensing-section 121 is supplied to the CPU 180 via the second ADC 184. Here, the sensed temperature values are ranged to be 0.5V–4V when amplified 15 times by an amplifier (not shown). That is, the first ADC 184 converts the amplified temperature values into the corresponding digital values and forwards them to the CPU 181. Upon receiving three different values via the first SPC 182, the first ADC 184, and the second ADC 186, the CPU 181 compares the received information to a predetermined look up value. In the controller 180, a predetermined look up table (not shown) of a plurality of temperature list with the corresponding DC level values is provided. Hence, upon detecting a bit-rate error signals from one of the BICDR receiver 120, the CPU 181 determines the temperature of the same BICDR receiver 120 based on the temperature information received therein via the first ADC 184. Thereafter, the CPU 181 retrieves the corresponding DC level representing bit rate from the lookup table stored therein and compares the retrieved DC level to the DC level received from the first DC level detecting section 162 via the second ADC 186. If they do not match, the CPU 181 generates a control signal to the same BICDR receiver 120 to adjust the bit rate accordingly.

Accordingly, the control device 181 supplies the controlled signal to the respective BICDR receivers 120, and transduces the same to an operational bit rate of the BICDR receiver 120, thereby transducing the bit rate by itself according to variation of the temperature for an active response to external environment.

The above description exemplified an employment of the bit rate transducer according to the present invention in the receiving section of the optical transmission system. However, it should be noted that the bit rate transducer may be employed in the transmitting section, or both in the receiving and transmitting sections.

As shown in FIG. 2, the bit rate transducer employed in the transmitting section according to the present invention includes the same elements as those employed in the receiving section. To be specific, the bit rate transducer of the transmitting section according to the present invention includes a plurality of BICDR transmitters 140, a second DC level value detecting section 170 included in the bit rate recognizing signal generating section 172, a second PSC 142, a second SPC 183, and a third and a fourth ADC 185, 187. The BICDR transmitters 140 includes a temperature sensing section 141 for generating signals indicating the temperature. The second DC level value detecting section 170 receives optical signals from the multiplexer 150, and detects a DC level value to supply a bit rate recognizing signal to the control device 180. The control device 180 receives the DC level value from the second level value detecting section 170, receives a temperature sensing signal from the temperature sensing section 141 of the corresponding BICDR transmitter 140, and compares the same with the bit rate according to the temperature stored in the memory. The control device 180 then recognizes the corresponding bit rate, and transduces the variation of the bit rate to an operational bit rate of the corresponding BICDR transmitter 140. The second PSC 142 included in the bit rate transducer according to the present invention converts the parallel signals to serial signals, while the second SPC 183 converts the serial signals to parallel signals. The third and the fourth ADC 185, 187 included in the bit rate transducer according to the present invention convert analog signals to digital signals. Therefore, the construction and operation of the transmitting section are essentially same as that described above with respect to the receiving section. Thus, the description of the function and operation of components within the transmitting section is omitted to avoid redundancy.

In summary, the bit rate transducer according to the present invention serves to enhance a reliability of an optical transmission system by actively responding to variation of external environment, particularly to variation of temperature. As described above, the present invention provides a more accurate transduction of a bit rate than the conventional bit rate transducer irrespective of external environment such as temperature by recognizing a bit-rate error signal and the temperature.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A bit rate transducer in an optical transmission system, comprising: a demultiplexer for demultiplexing optical signals into different wavelength channels; a plurality of bit rate receivers, each bit rate receiver coupled to an output of said demultiplexer for converting a demultiplexed optical signal into a corresponding electrical signal and for generating a bit-rate error signal, said bit rate receiver having a sensing means for generating a temperature reference signal, a detecting section coupled to outputs of said demultiplexer for generating signals indicative of the bit rates of the optical signals outputted from said demultiplexer; and, a controller for comparing each bit rate detected by said detecting section with a predetermined data to generate a control signal that is used to adjust the bit rate of one of the bit rate receivers, wherein said controller compares each bit rate detected by said detecting section in response to one of the bit-rate error signals and one of the temperature reference signals.

2. The bit rate transducer of claim 1, further comprising a switch for outputting said electric signal from a respective bit rate receiver to a respective bit rate transmitter.

3. The bit rate transducer of claim 1, further comprising a parallel-to-serial converter for converting the bit-rate error signals generated from said plurality of bit rate receivers into serial signals, and a serial-to-parallel converter for supplying the serial signals outputted from said parallel-to-serial converter to said controller as parallel signals.

4. The bit rate transducer of claim 1, further comprising a first analog-to-digital converter for supplying each temperature reference signal of a bit rate receiver to said controller as a digital signal.

5. The bit rate transducer of claim 1, further comprises a second analog-to-digital converter for supplying the signal indicative of bit rate detected by said detection section to said controller as digital signals.

6. The bit rate transducer of claim 1, wherein said predetermined data comprises a list of reference temperatures with corresponding reference bit rates.

7. The bit rate transducer of claim 1, wherein said controller generates a control signal based on one of the temperature reference signals and one of the bit-rate error signals received thereon with said predetermined data.

8. The bit rate transducer of claim 1, further comprising a means for generating said bit-rate error signal, wherein said bit-rate error signal is generated based on a difference between the bit rate of the electrical signal converted by said bit rate receiver and a pre-set bit rate.

9. A bit rate transducer in an optical transmission system, comprising: a plurality of bit rate transmitters for converting incoming electrical signals into corresponding optical signals and for generating bit-rate error signals, each bit rate transmitter having a sensing means for generating a temperature reference signal; a multiplexer for multiplexing the converted optical signals outputted from said plurality of bit rate transmitters; a detecting section coupled to outputs of said multiplexer for generating signals indicative of the bit rates of the optical signals outputted therefrom; and, a controller for comparing each bit rate detected by said detecting section with a predetermined data to generate a control signal that is used to adjust the bit rate of one of the bit rate transmitters, wherein said controller generates a control signal based on one of the temperature reference signals and one of the bit-rate error signals received thereon with said predetermined data.

10. The bit rate transducer of claim 9, further comprising a switch for providing said incoming electrical signals to the plurality of said bit rate transmitters.

11. The bit rate transducer of claim 9, further comprising a parallel-to-serial converter for converting the bit-rate error signals generated from said plurality of bit rate transmitters into serial signals, and a serial-to-parallel converter for supplying the serial signals outputted from said parallel-to-serial converter to said controller as parallel signals.

12. The bit rate transducer of claim 9, further comprising a first analog-to-digital converter for supplying each temperature reference signal of a bit rate transmitter to said controller as a digital signal.

13. The bit rate transducer of claim 9, further comprising a second analog-to-digital converter for supplying each signal indicative of a bit rate detected by said detection section to said controller as a digital signal.

14. The bit rate transducer of claim 9, wherein said predetermined data comprises a list of reference temperatures with corresponding reference bit rates.

15. The bit rate transducer of claim 9, wherein said controller compares each bit rate detected by said detecting section in response to one of the bit-rate error signals and one of the temperature reference signals.

* * * * *